Dec. 8, 1925.

W. H. SOMMER 1,565,112

AUTOMATIC COUPLER FOR INDUSTRIAL TRUCKS

Filed Oct. 16, 1922     2 Sheets-Sheet 1

INVENTOR.
William H. Sommer
ATT'Y

Dec. 8, 1925.
W. H. SOMMER
1,565,112
AUTOMATIC COUPLER FOR INDUSTRIAL TRUCKS
Filed Oct. 16, 1922     2 Sheets-Sheet 2
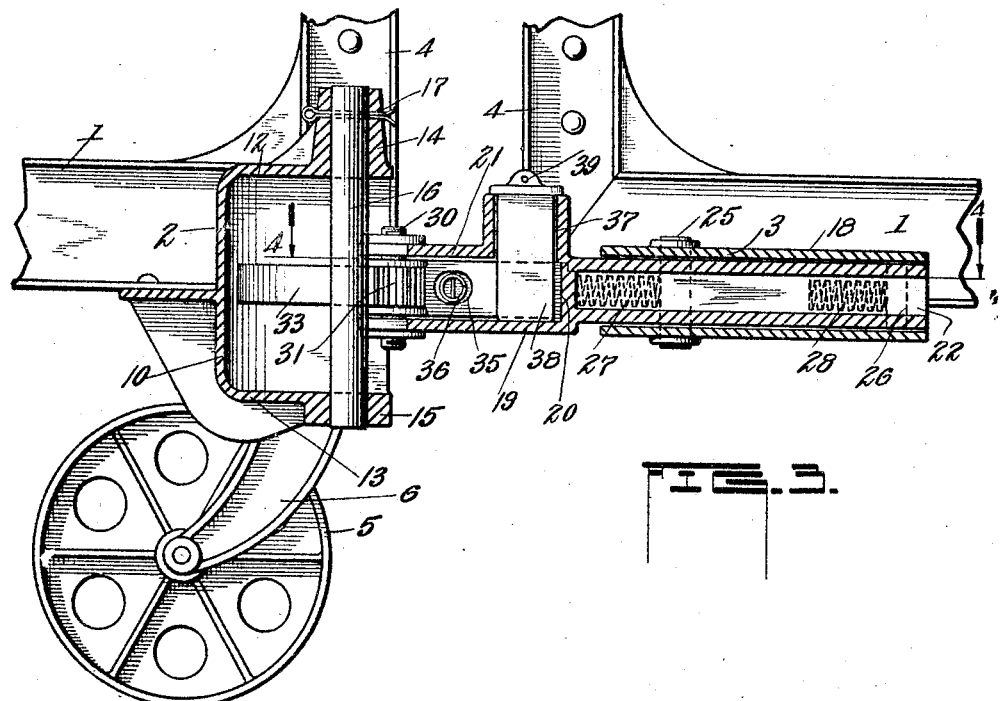
FIG. 3.
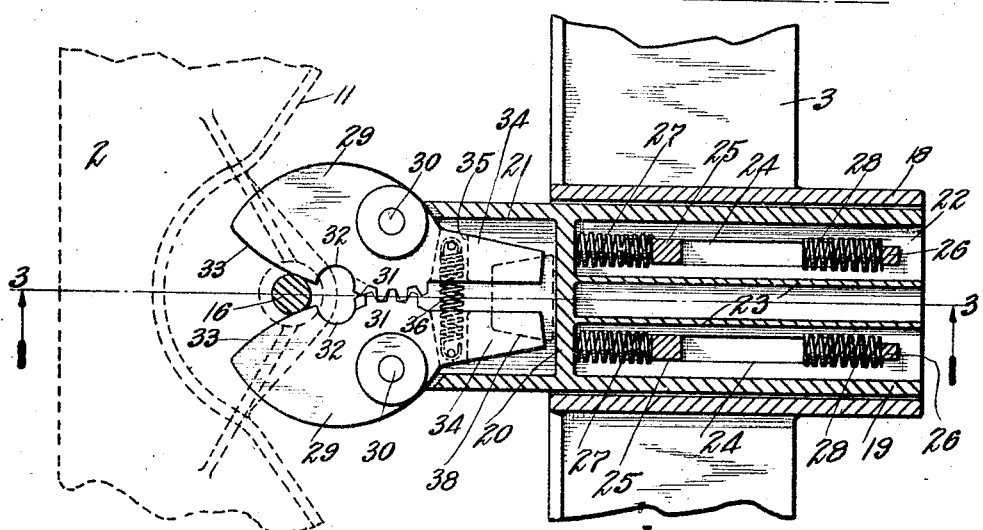
FIG. 4.
INVENTOR
William H. Sommer
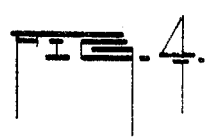
ATT'Y Patented Dec. 8, 1925.

1,565,112

UNITED STATES PATENT OFFICE.

WILLIAM H. SOMMER, OF PEORIA, ILLINOIS.

AUTOMATIC COUPLER FOR INDUSTRIAL TRUCKS.

Application filed October 16, 1922. Serial No. 594,874.

*To all whom it may concern:*

Be it known that I, WILLIAM H. SOMMER, a citizen of the United States, residing at Peoria, in the county of Peoria and State of Illinois, have invented new and useful Improvements in Automatic Couplers for Industrial Trucks, of which the following is a specification.

This invention has reference to couplers and it relates particularly to couplers especially adapted for use in connection with industrial trucks.

Industrial plants, particularly where heavy materials are being manufactured are dispensing with the hand truck and substituting in lieu thereof motor driven trucks, and the tendency is toward the individual motive unit designed to be coupled to and adapted to draw one or more trucks therebehind, in the form of a train. One of the difficulties encountered with this form of hauling, particularly with inter-plant movements, is the coupling of the truck units which will allow for the coupling of the motive unit to a truck, and the coupling of the trucks to each other, whether or not the motive unit is in a direct line with the truck unit and the truck units in direct line with each other, or the individual units are at an angle to each other, excepting of course at complete right angles. In interplant movements with motive units and truck units of the character referred to there are no tracks, and therefore, it is desirable when the motive unit is backed up to a truck unit, and the latter are backed up to each other, that the coupling between the units shall be of a character which will permit easy and permanent coupling when the units are in direct line with each other or at angles thereto, and such couplings should be of such a resilient character that when the motive unit is started its momentum may be acquired before a direct pull is made upon the attached units, whereby stalling of the motive unit is practically avoided.

One of the objects of the present invention is to provide a wheeled truck capable of supporting and hauling heavy materials and which is provided with complementary coupling means at opposite ends; the coupling means at the front end being of a character adapted to have a coupling connection with a coupling means similar to that connected with the rear end of said truck.

The invention has for a further object to provide at one end of the truck of the character referred to an individual coupling element, and at the rear end of the truck a draw bar resiliently supported to have longitudinal play when a direct pull is made upon the coupling members, and jaws pivotally connected with said draw bar adapted to have coupling connection with coupling means on a truck unit similar to that provided at the forward end of the truck.

This application is a companion to the application filed by me of even date herewith, for improvements in truck couplers Serial Number 594,873.

That the invention may be more fully understood, reference is had to the accompanying drawings forming a part of this description, showing a preferred embodiment of the invention, in which:

Fig. 3 is a vertical longitudinal section of the coupling means in the relation in which the parts are shown in Fig. 4, and as the same would appear on the line 3—3 Fig. 4, and Fig. 4 is an enlarged detailed view partly in section of the coupling mechanism, the parts being in a position as they are about to be coupled, and as the same would appear on the line 4—4 Fig. 3.

Like characters of reference denote corresponding parts thruout the figures.

Figure 1:
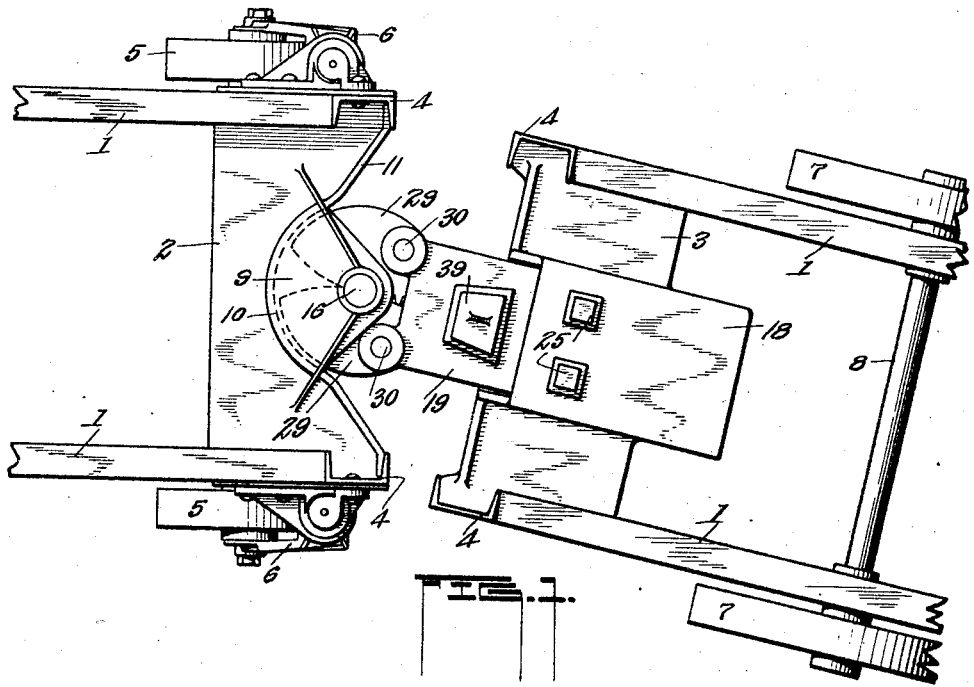
Fig. 1 is a plan view of the rear end of one truck and the forward end of another, each of which correspond to each of the front and rear ends of both trucks, and my improved coupling mechanism applied thereto, the view showing how the trucks may be coupled when they are not in a direct line.
Figure 2:
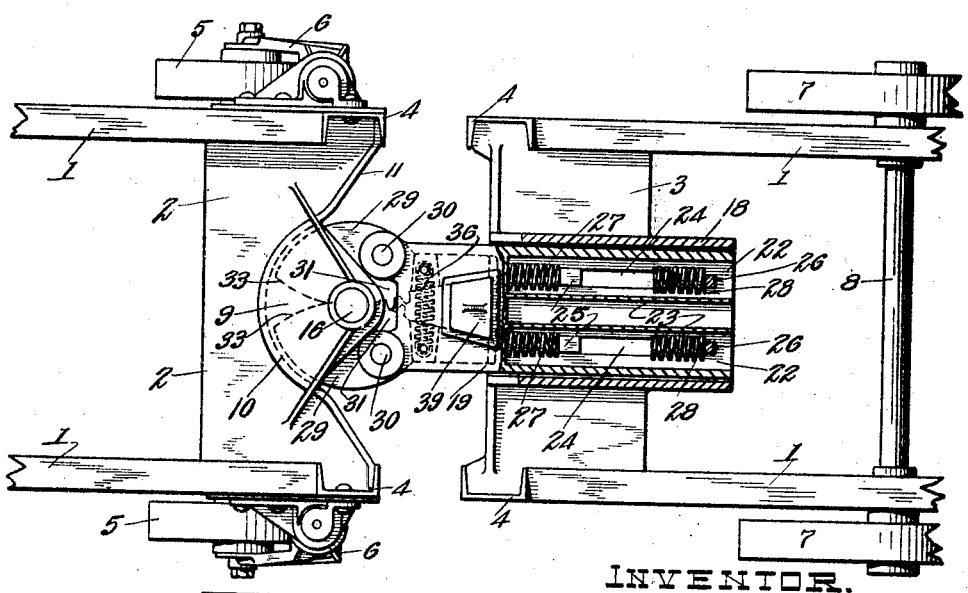
Fig. 2 is a view somewhat similar to Fig. 1, except that part of the coupling mechanism on the rear end of the front truck is in section and the two trucks are shown in direct line.

In describing the coupling mechanism it will be understood, that altho the motive unit is not shown it may be of any suitable character and preferably provided with a coupling means such as will be described connected with the rear end of a truck unit; and it will also be understood that each truck unit embodies connectible coupling means at its front and rear ends to adapt each unit to be coupled front and rear with other truck units embodying substantially the same coupling means at front and rear ends respectively. For the purpose of illustration the drawings show parts of two truck units coupled at their front and rear ends respectively for the purpose of illustrating their connection with each other, the number of truck units in a train being limited only by the capacity of the motive unit for pulling or drawing the same.

The construction of the truck units is very clearly shown and described in the companion application filed of even date herewith and only a brief reference therefore will be made to the similar structure disclosed herein; wherein, the truck includes preferably the longitudinal sills or beams 1, connected at their front ends by a cross-frame or casting 2 and at their rear ends by a cross-frame or casting 3. Upstanding from each corner of a truck are up-rights or standards 4. The front end of the truck is preferably mounted on castor wheels 5 carried by bearings 6 journaled on the truck frame, and the rear end of such truck frame is supported on wheels 7 carried by a transversely disposed axle 8.

Reference being had to the coupling means connected with the front end of a truck, the frame or casting 2 is preferably provided with an open housing 9 the rear wall 10 of which is substantially semi-circular which merges into the diverging front walls 11 of the frame or casting 2 and the upper and lower walls 12 and 13 of said housing are suitably spaced apart for the purpose of giving considerable depth to the housing to facilitate the coupling of the rear end of a similar truck thereto, whether or not the two trucks are in substantially the same horizontal plane. The upper and lower walls of the housing terminate at their front ends in aligned bearings 14 and 15, respectively, in which has a bearing a vertically disposed coupling rod 16 which may be held in position by a cotter-pin 17 or some suitable means passed thru the bearing 14 and the rod 16, see Fig. 3.

Reference being had to the coupling means connected to the rear end of the truck, the frame or casting 3 is provided with a preferably elongated rectangular housing 18 disposed axially and longitudinally of the truck and open at both ends. In this housing is carried a draw bar 19 chambered at its front and rear ends and separated by a transverse dividing wall 20; the chamber designated 21 being open-ended and the front chamber 22 separated into two parallel chambers formed by the side walls of the draw bar and spaced intervally disposed walls 23. The upper and lower walls of the forward chamber of the draw bar are provided with longitudinal slots 24 thru which project short posts 25 having a bearing in the upper and lower walls of the housing 18 and disposed in a similar manner in the forward end of the divided chamber of the draw bar are posts 26 connected with the upper and lower walls of said draw bar. Between the posts 25 and the partition 20 are disposed coil springs 27, and between the respective posts 25 and 26 are disposed coiled springs 28, the springs 28 serve to take up the shock due to a pull on the trucks after the coupling operation and the springs 27 take up the rebound; the slots 24 permitting freedom of movement of the posts 25 when a pull is made upon the trucks by the motive unit and to allow the motive unit to get under momentum before a direct pull is made upon the coupling mechanism.

The coupling means connected with the draw bar 19 comprises a pair of duplicate segments 29 part of which lie within the chamber 21 of the draw bar and part of which lie therewithout and the said segments have an eccentric pivotal connection thru the spindles 30 journaled in the upper and lower walls of the chamber 21 constituting the rear extension of the draw bar and said segments have the intermeshing tooth portions 31, the semi-circular seats 32 and the forwardly oppositely beveled walls 33. The forward wing extensions 34 of the segments are normally separated and have corresponding sockets 35 arranged transversely therein and opening towards each other in which is seated and secured the coiled spring 36. The upper wall of the chamber 21 of the draw bar is provided with an upstanding open-ended bearing 37 which is in communication with the chamber 21 and into which may be inserted and also withdrawn therefrom the securing pin 38 to the head-end 39 of which may be connected any suitable operating means to raise and lower the said locking pin.

In the operation of coupling the draw bar 19 thru the segments 29 to the coupling rod 16, the securing pin is withdrawn from between the forward extensions 34 of said segments which will permit the forward ends of the segments to be moved toward each other and compress the spring 36. As one truck is backed for coupling relation with another the beveled faces 33 of the segments will enter the housing 9, held in a direct line and at angles therefrom and embrace the opposite sides of the rod 16, such rod entering between the gripping jaws of the segments and being seated in the seats 32 of said segments and when so disposed the spring 36 will act to separate the forward ends of the segments and cause a gripping of the jaws thereof, formed between seats 32, around the coupling rod 16, when the attendant or operator will drop the pin 36, between the forward ends of the segments to hold the same in locking relation with the rod 16. During the coupling operation and to cause a separation of the forward ends of the segments 29 to permit the pin 38 to be dropped into position and inserted therebetween, the front truck is backed so as to cause the rod 16 to bear against the rear teeth of the segments 31 which act as a fulcrum to cause the forward ends of the segments to be operated, when the pin 38 may be dropped therebetween as stated. Releasing the pin 38 and pulling on the truck will cause the rod 16 to bear against the rear portions of the notches 32 and cause a separation of the segments which will automatically release the coupling members from each other.

The herein described coupling mechanism is a very simple, efficient and inexpensive coupling for industrial trucks, dependable in operation and of such a character that danger to the attendant during the coupling operation is practically eliminated.

One of the principal objects of the coupling mechanism is to provide an automatic safety coupler for trucks intended for use in industrial establishments. The trucks illustrated may be propelled by manual power if so desired, but are preferably designed for motor propulsion.

What I claim is:—

1. An automatic coupler, including coacting coupling mechanisms, one of which comprises a housing and a vertically disposed rod secured therein; the other of which comprises a draw bar recessed at its opposite ends, one recessed end having slots in its walls, a pair of spaced resilient means in the latter recessed end, fixed means extending through the slots of the draw bar in the space between said spaced resilient means and engageable only with one of the latter at a time for permitting limited longitudinal movement of the draw bar, the latter being cushioned at each end of such limit of movement by said resilient means, a pair of coacting coupling members pivotally connected with said draw bar in the opposite and recessed end and adapted to have coupling connection with said rod, and removable means adapted to hold the coupling mechanism in coupling relation.

2. An automatic coupler, including coacting coupling mechanisms, one of which comprises a housing and a vertically disposed rod secured therein; the other of which comprises a slidably mounted draw bar, resilient means for cushioning the longitudinal movement of the draw bar in both directions, a pair of gripping jaws having a pivotal connection with said draw bar adapted to have coupling connection with said rod, said draw bar having an upstanding open-ended bearing adjacent the inner ends of said jaws, and removable means arranged within the bearing for engaging between the inner ends of the jaws to hold the coupling mechanism in coupling relation.

3. An automatic coupler, including coacting coupling mechanisms, one of which comprises a housing and a vertically disposed rod secured therein; the other of which comprises a draw bar, resilient means for permitting limited longitudinal movement of the draw bar, a pair of coacting jaws pivotally connected with said draw bar and adapted to have coupling connection with said rod, said jaws having intermeshing teeth and complementary engaging means for the rod, means housed within the drawbar and yieldingly connecting the forward ends of said jaws, and removable means adapted to be inserted between the forward ends of said jaws to hold the same in coupling relation with said rod.

4. An automatic coupler, including coacting coupling mechanisms, one of which comprises a housing and a vertically disposed rod secured therein; the other of which comprises a chambered draw bar, resilient means for permitting limited longitudinal movement of the draw bar, a pair of coacting jaws pivotally connected with said draw bar within the chamber thereof, said jaws having diverging beveled faces and complementary seats to receive said rod, means within the chamber of the drawbar yieldingly connecting the forward ends of said jaws, said draw bar chamber having a communicating lateral extension, and removable means arranged within the chamber extension and adapted to enter in between said jaws to hold the same in coupling connection with said rod.

5. A coupling mechanism for one end of an industrial truck, comprising a frame having an open housing the rear wall of which is transversely semi-circular terminating in oppositely diverging beveled walls, and a coupling rod secured in a vertical position in said housing and removed from the semi-circular wall thereof.

6. A coupling mechanism for one end of an industrial truck, comprising a frame provided with an open-ended housing, a draw bar slidable in said housing and having both ends chambered, resilient means in the chamber at one end for permitting limited longitudinal movement of the draw bar, a pair of coacting jaws in the chamber at the opposite end pivotally connected with said draw bar having complementary seats for engaging a coupling member, and a removable part adapted to hold the jaws in coupling position.

7. A coupling mechanism for the front and rear ends of industrial trucks including coupling means whereby the trucks may be connected in train; the mechanism for one end of the truck comprising an open housing with a rear semi-circular wall and a vertically disposed coupling stem removed from said wall; mechanism for the opposite end of the truck including frame having an open-ended housing, a draw bar slidably arranged in said housing and having a chamber in each end, the chambered end within the housing being longitudinally slotted, a pin secured in the housing and passing through the slot of said draw bar, resilient means within the slotted end chamber and on opposite sides of the pin for permitting limited longitudinal movement of said draw bar, a pair of coacting jaws within the opposite chamber pivotally connected with said draw bar and having complementary seats for engaging said coupling stem means yieldingly connecting the said jaws, and a removable means for holding the jaws in coupling position.

WILLIAM H. SOMMER.